(12) United States Patent
Bavishi

(10) Patent No.: US 11,194,518 B2
(45) Date of Patent: Dec. 7, 2021

(54) POINTER DEREFERENCING WITHIN MEMORY SUB-SYSTEM

(71) Applicant: Micron Technology, Inc., Boise, ID (US)

(72) Inventor: Dhawal Bavishi, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 80 days.

(21) Appl. No.: 16/694,469

(22) Filed: Nov. 25, 2019

(65) Prior Publication Data

US 2021/0157518 A1 May 27, 2021

(51) Int. Cl.
*G06F 3/06* (2006.01)
*G06F 12/0815* (2016.01)
*G06F 12/0877* (2016.01)

(52) U.S. Cl.
CPC ............ *G06F 3/0659* (2013.01); *G06F 3/061* (2013.01); *G06F 3/0679* (2013.01); *G06F 12/0815* (2013.01); *G06F 12/0877* (2013.01); *G06F 2212/7201* (2013.01)

(58) Field of Classification Search
CPC ...... G06F 3/061; G06F 3/0611; G06F 3/0644; G06F 3/0659; G06F 3/0673; G06F 3/0679; G06F 12/0815; G06F 12/0877; G06F 2212/7201
USPC .......................................... 711/154, 202, 220
See application file for complete search history.

(56) References Cited

U.S. PATENT DOCUMENTS

| | | | |
|---|---|---|---|
| 2006/0031791 A1* | 2/2006 | Moona | G06F 30/327 716/103 |
| 2009/0018993 A1* | 1/2009 | McCool | G06F 16/2453 |
| 2009/0132979 A1* | 5/2009 | Waters | G06F 30/327 716/106 |

* cited by examiner

*Primary Examiner* — Gary J Portka
(74) *Attorney, Agent, or Firm* — Schwegman Lundberg & Woessner, P.A.

(57) ABSTRACT

Various embodiments described herein provide for a memory sub-system read operation or a memory sub-system write operation that can be requested by a host system and involves performing a multi-level (e.g., two-level) pointer dereferencing internally within the memory sub-system. Such embodiments can at least reduce the number of read operations that a host system sends to a memory sub-system to perform a multi-level dereferencing operation.

20 Claims, 15 Drawing Sheets

POINTER DEREFERENCING WITHIN MEMORY SUB-SYSTEM

TECHNICAL FIELD

Embodiments of the disclosure relate generally to memory sub-systems, and more specifically, relate to pointer dereferencing (e.g., data structure dereferencing) within a memory sub-system.

BACKGROUND

A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
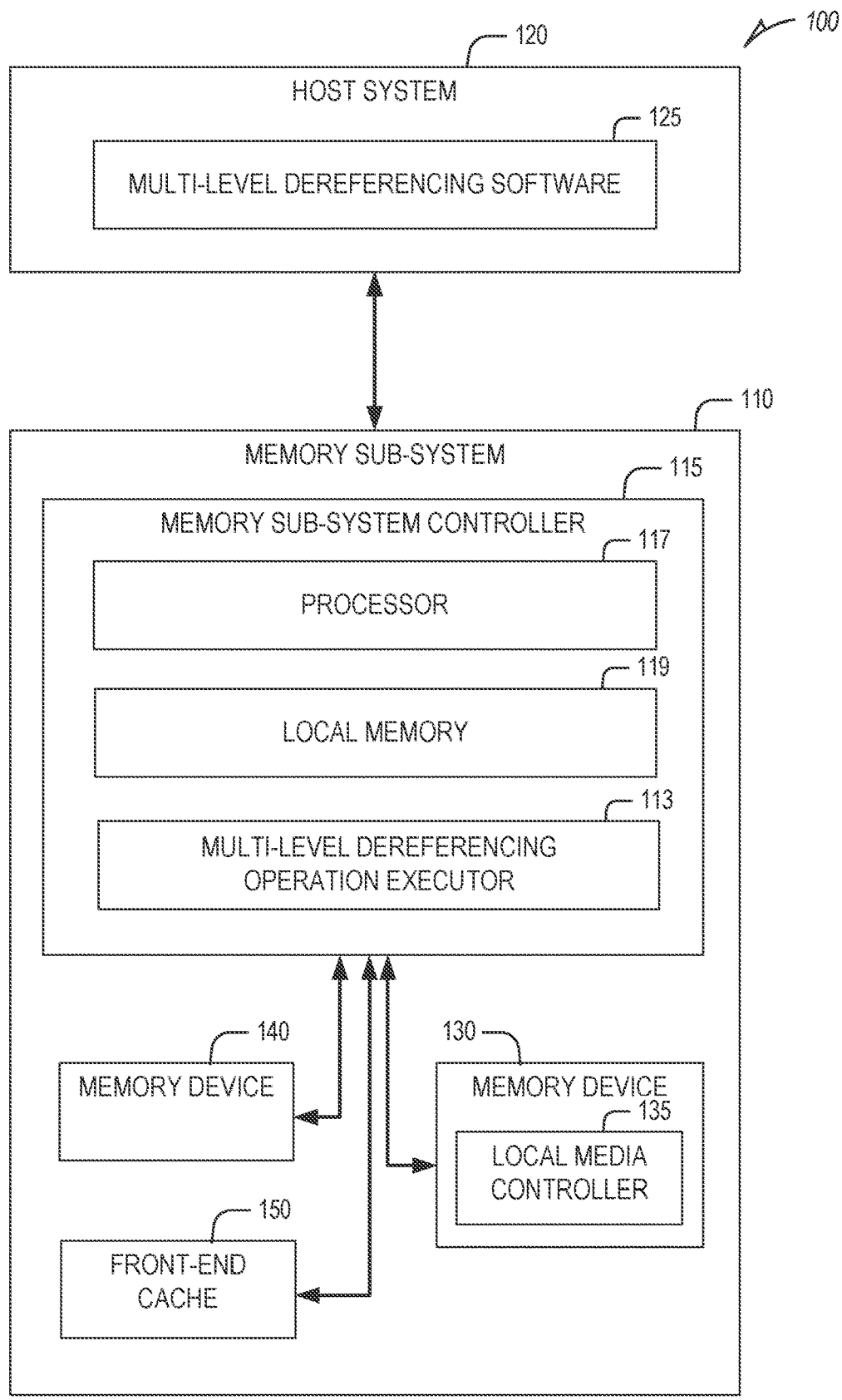
FIG. 1 illustrates an example computing environment that includes a memory sub-system in accordance with some embodiments of the present disclosure.

Aspects of the present disclosure are directed to pointer dereferencing (e.g., data structure dereferencing) within a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data.

Oftentimes, software applications, such as user-level application kernels, use multi-level pointer dereferencing of pointers implementing data structures, such as two-level dereferencing of pointers implementing data structures, where dereferencing one pointer associated with a data structure provides index data (e.g., index information) that can be used to dereference another pointer associated with another data structure. An example of two-level dereferencing, as denoted in high-level language syntax (e.g., in user space or kernel space), can include a[b[i]], where dereferencing of an array data structure a uses an element from another array structure b. With respect to a memory location (in a memory sub-system) referenced by a[b[i]], an example read operation can include c=a[b[i]], and an example write operation can include a[b[i]]=c. Many scientific computing kernels use this type of two-level dereferencing (to access memory locations) for performing computations in connection with simulating real-world physical systems. Traditionally, accessing (e.g., reading from or writing to) a memory location corresponding to a[b[i]] involves an operation (e.g., by a host system) to read index data from a memory location corresponding to b[i], and then (e.g., the host system) dereferencing index of the array data structure a (using the index data read from the memory location b[i]) to read data from a memory location corresponding to a[b[i]]. Because of the dependency between data structures a and b in facilitating two-level dereferencing by a[b[i]], traditional two-level dereferencing can result in stalling an instruction pipeline (of a host system's processor) if index data from a memory location corresponding to b[i] is not available in a register or a cache of the memory sub-system. The index data not being available can introduce even more latency when data structure a, data structure b, or both are large or involve indexing within the memory sub-system.

Aspects of the present disclosure address the above and other deficiencies by having a memory sub-system (e.g., non-volatile dual in-line memory module (NVDIMM) device) perform a multi-level (e.g., two-level) dereferenced read operation or a multi-level (e.g., two-level) dereferenced write operation internally within the memory sub-system, at the request of a host system. For instance, various embodiments provide a method that performs multi-level (e.g., two-level) dereferencing in connection with two or more data structures (e.g., two-array data structures), and performs a write operation or a read operation with respect to results of the multi-level dereferencing. At the request of a host system (e.g., request via a memory sub-system command to a memory sub-system), the memory sub-system can internally perform a multi-level dereferenced read or write operation while avoiding the traditional involvement of a host system (e.g., avoid the host system performing multiple dereferencing operations). A multi-level dereferenced write operation described herein can be regarded as a memory sub-system bounded write operation with multi-level dereferencing, and a multi-level dereferenced read operation described herein can be regarded as a memory sub-system bounded read operation with multi-level dereferencing. Though various embodiments are described herein with respect to two-level dereferencing, features of those embodiments can be expanded to support dereferencing of three or more levels (e.g., three-level dereferencing of a memory location corresponding to a[b[c[i]]).

By use of various embodiments described herein, a host system can at least reduce the number of read operations that the host system sends to a memory sub-system in performing a multi-level dereferencing operation. Additionally, use of various embodiments described herein can be particularly beneficial with a large pool of memory sub-systems, such as a memory sub-system pool used for storing or working with large datasets. For instance, a memory sub-system command to perform a dereferenced read operation or a dereferenced write operation can be issued to the pool and, in response, the pool can internally perform dereferencing, resolve potential dependencies, and return data (for a read operation) or write data to a memory location with reduced interactions with the host system. In doing so, a host system can access and process large data sets (on the pool) involving multi-level dereferencing more quickly and using while leveraging the processing power of a memory sub-system.

As used herein, a data structure can be implemented by at least one pointer (storing a memory address) that can be dereferenced by index or key data to access (e.g., read or write) an element of the data structure. The index or key data can comprise a numerical value, which can serve as a memory address offset. Examples of a data structure can include, without limitation, an array data structure or a list data structure. As used herein, index data can comprise information that can be used as a memory address offset. For various embodiments described herein, a host system informs a memory sub-system of the memory address endian-ness (e.g., byte-wise addressing of memory from lower to higher) the host system is using, thereby enabling the memory sub-system to properly apply the index data as a memory offset.

Disclosed herein are some examples of systems for pointer dereferencing (e.g., data structure dereferencing) within a memory sub-system, as described herein.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing system 100 can be a computing device such as a desktop computer, laptop computer, network server, mobile device, a vehicle (e.g., airplane, drone, train, automobile, or other conveyance). Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein. "coupled to" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface. Fibre Channel, Serial Attached SCSI (SAS), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type and NAND type flash memory are described, the memory device 130 can be based on any other type of non-volatile memory, such as read-only memory (ROM), phase change memory (PCM), self-selecting memory, other chalcogenide based memories, ferroelectric random access memory (FeRAM), magneto random access memory (MRAM), negative-or (NOR) flash memory, electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The host system 120 includes a multi-level dereferencing software 125 that enables the host system 120 to support multi-level (e.g., two-level) dereferenced write or read operations (hereafter, a dereferenced read operation and a dereferenced write operation respectively) with respect to the memory sub-system 110. In particular, the multi-level dereferencing software 125 can enable the host system 120 to send, to the memory sub-system 110, a memory sub-system command that requests performance of a dereferenced read operation or a dereferenced write operation internally within the memory sub-system 110.

For example, the multi-level dereferencing software 125 can compile (software) source code data, which includes one or more statements according to programming language (e.g., a high-level programming language), into one or more instructions executable (e.g., in a user space) by a processing device of the host system 120. During compilation, the multi-level dereferencing software 125 can treat a programming language statement c=a[b[i]] in the source code data as a dereferenced read operation with respect to a first memory address for a first data structure a and a second memory address for an element i of a second data structure b (e.g., b[i]). The multi-level dereferencing software 125 (during compilation) can convert this programming language statement into an instruction (a new type of instruction in an instruction set architecture (ISA)) that causes the processing device to determine the first memory address of the first data structure a and determine the second memory address for the element i of the second data structure b, and that causes each of these memory addresses to be provided to the memory sub-system 110 as part of a memory sub-system command that requests performance of dereferenced read operation. The conversion can comprise the processing device performing a virtual memory address-to-physical memory address translation (e.g., using a translation lookaside buffer (TLB) of a processing device) to determine the first memory address (for the first data structure a) and to determine the second memory address (for element i of the second data structure b). In this way, the multi-level dereferencing software 125 can know in which physical memory address locations (e.g., within a large main memory pool) data structures a and b reside.

Additionally, during compilation, the multi-level dereferencing software 125 can treat a programming language statement a[b[i]]=c in the source code data, as a dereferenced write command with respect to a first memory address for a first data structure a, and a second memory address for an element i of a second data structure b, and a third memory address for a variable c. The multi-level dereferencing software 125 (during compilation) can convert this programming language statement into an instruction (a new type of instruction in an instruction set architecture (ISA)) that causes the processing device to determine the first memory address of the first data structure a, determine the second memory address for the element i of the second data structure b, and determine the third memory address for the variable c, and that causes each of these memory addresses to be provided to the memory sub-system 110 as part of a memory sub-system command that requests performance of a dereferenced write operation. The conversion can comprise the processing device performing a virtual memory address-to-physical memory address translation (e.g., using a translation lookaside buffer (TLB) of a processing device) to determine the first memory address (for the first data structure a) and to determine the second memory address (for element i of the second data structure b). In this way, the multi-level dereferencing software 125 can know in which physical memory address locations (e.g., within a large main memory pool) data structures a and b reside.

Alternatively, for some embodiments, the multi-level dereferencing software 125 enables an operating system or device driver operating on the host system 120 to insert one or more calls on faults to call appropriate one or more interrupt service routines (ISRs) to handle a programming language statement c=a[b[i]] with a memory sub-system command requesting a dereferenced read operation, or to handle a programming language statement a[b[i]]=c with a memory sub-system command requesting a dereferenced write operation.

For some embodiments, the multi-level dereferencing software 125 causes the host system 120 to allocate (e.g., by device driver or locking-page system call) physical page frames for a data structure in un-swappable memory space of the host system 120 so the data structure cannot be swapped. Additionally, for some embodiments, the multi-level dereferencing software 125 causes the host system 120 to render a data structure uncacheable by caches close to the processing device of the host system 120, thereby causing the data structure to live within the memory sub-system 110 and avoiding coherence issues.

If a data structure can be cached (to a cache system on the host system 120), for a dereferenced write operation, the multi-level dereferencing software 125 can cause further reads to the cache system (for the dereferenced write operation) to be stalled, and a mechanism to update or invalidate modified data locations in the processor cache systems is present.

In addition to the host system 120 sending the memory sub-system 110 memory addresses of the data structure a and data structure element b[i] (in connection with a memory sub-system command for a dereferenced read operation or a dereferenced write operation), the host system 120 can send a data type (e.g., integer, character, float, etc.), or a data size (e.g., 16-bit, 32-bit, 64-bit, etc.) of the data structures a and b. For various embodiments described herein, the data type or data size enables the memory sub-system 110 to access the proper memory locations with respect to the memory addresses provided with a dereferenced operation.

For some embodiments, the memory sub-system 110 can support Little-endian memory addresses, Big-endian memory addresses, or both types of memory addresses. At the start of the memory sub-system 110, the multi-level dereferencing software 125 can cause the host system 120 to indicate memory address endian-ness (e.g., Little-endian or Big-endian) that will be used with respect to the dereferenced operations sent from the host system 120 to the memory sub-system 110.

For some embodiments, the memory sub-system 110 includes a front-end cache 150, which can be used to access (e.g., read or write) data with respect to the memory devices 130, 140. According to some embodiments, the front-end cache 150 is configured to be a non-blocking cache that includes at least one command queue for servicing incoming command requests. For instance, the front-end cache 150 can comprise one or more cache lines, where each particular cache line can have an associated tag (e.g., memory address tag) that can determine the range of memory addresses of the memory devices 130, 140 that the particular cache line is used to access. Additionally, the front-end cache 150 can comprise one or more command queues (e.g., outstanding command queues), each of which can be assigned (e.g., designated) to an individual cache line and used to queue (e.g., store) incoming command requests (e.g., read or write requests from the host system 120) to be performed with respect to its respective assigned cache line. A particular command queue can be assigned to a particular cache line by associating the tag of the particular cache line with the particular command queue. For some embodiments, there are less command queues than cache lines (e.g., 4096 cache lines for every one command queue) and, accordingly, command queues can be dynamically assigned and unassigned to cache lines based on command requests that flow into the memory sub-system 110. If there are no available command queues left to assign to (currently unassigned) cache lines associated with a new incoming command request, all incoming command requests from the host system 120 can be paused (e.g., according to a NVDIMM-P memory protocol, the memory sub-system will not provide the host system 120 with credit to send more requests and causes a back pressure to the host system 120).

The memory sub-system 110 includes a multi-level dereferencing operation executor 113 that enables or facilitates performance of a multi-level dereferenced read operation or a multi-level dereferenced write operation of some embodiments by the memory sub-system 110. In some embodiments, the memory sub-system controller 115 includes at least a portion of the memory sub-system-bounded memory function executor 113. For example, the memory sub-system controller 115 can include a processor 117 (processing device) configured to execute instructions stored in local memory 119 for performing the operations described herein. In some embodiments, the memory sub-system-bounded memory function executor 113 is part of the host system 110, an application, or an operating system.

For some embodiments, the host system 120 requests the memory sub-system to perform a multi-level dereferenced read operation by a memory sub-system command encoded as a DREAD command in accordance with a memory protocol, such as non-deterministic memory protocol (e.g., a NVDIMM-P memory protocol). For example, with respect to a NVDIMM-P memory protocol, the DREAD memory sub-system command can be similar to an XWRITE-type memory sub-system command on a command (CMD) signal line, and the memory address issued with the DREAD memory sub-system command (on the CMD signal line) is the physical memory address of either data structure a and element i of data structure b, while the other memory address is issued on a data (DQ) signal line. Additionally, for some embodiments, the host system 120 requests the memory sub-system to perform a multi-level dereferenced write operation by a memory sub-system command encoded as a DWRITE command in accordance with a memory protocol, such as non-deterministic memory protocol (e.g., a NVDIMM-P memory protocol). For instance, with respect to a NVDIMM-P memory protocol, the DWRITE memory sub-system command can be similar to an XWRITE-type memory sub-system command on a command (CMD) signal line, and the memory address issued with the DWRITE memory sub-system command (on the CMD signal line) is the physical memory address of either data structure a, element i of data structure b, or variable c, while the other memory addresses are issued on a data (DQ) signal line. Alternatively, for some embodiments, one of the other memory addresses (e.g., of data structure element b[i]) is issued on the data (DQ) signal line with the DWRITE memory sub-system command, and the remaining memory address (e.g., of variable c) is issued to the memory sub-system 110 using another memory sub-system command, such as a companion dereferenced write memory sub-system command (DDWRITE memory sub-system command) on the command (CMD) signal line that follows. For various embodiments, both a memory sub-system command that requests a multi-level dereferenced read operation, and a memory sub-system command that requests a multi-level dereferenced write operation, send memory addresses (e.g., physical memory address) of data structures a and b[i] using a memory protocol (e.g., a NVDIMM-P memory protocol), and a memory sub-system command that requests a multi-level dereferenced write operation further sends a memory address of a variable c.

In response to the memory sub-system 110 receiving from the host system 120 a memory sub-system command that requests a dereferenced read operation with respect to a data structure element corresponding to a[b[i]], the multi-level dereferencing operation executor 113 can cause the memory sub-system controller 115 to handle the two-level dereferencing of a[b[i]] to read data from the memory location corresponding to the a[b[i]]. Once data (target data) is read out from the memory location corresponding to the data structure element a[b[i]], the multi-level dereferencing operation executor 113 can cause the memory sub-system controller 115 to issue a response (e.g., RSP_n according to the NVDIMM-P memory protocol) from the memory sub-system 110 (e.g., the NVDIMM-P target) to the host system 120 (e.g., the NVDIMM-P initiator) to indicate that the data (target data) is ready to be read by the host system 120. This can be followed by the host system 120 issuing a send memory sub-system command (e.g., SEND command according to a NVDIMM-P memory protocol), and the multi-level dereferencing operation executor 113 can cause the memory sub-system controller 115 to respond by sending the read-out data (target data) to the host system 120 (e.g., NVDIMM-P initiator).

In response to the memory sub-system 110 receiving from the host system 120 a memory sub-system command that requests a dereferenced write operation with respect to a data structure element corresponding to a[b[i]] and a variable c, the multi-level dereferencing operation executor 113 can cause the memory sub-system controller 115 to handle the two-level dereferencing of a[b[i]] to write data (from a variable c) to the memory location corresponding to the a[b[i]]. Once data (target data) is read out from the memory location corresponding to variable c, the multi-level dereferencing operation executor 113 can cause the memory sub-system controller 115 to write the read-out data (target data) to the memory location corresponding to data structure element a[b[i]]. Subsequently, the multi-level dereferencing operation executor 113 can cause the memory sub-system controller 115 to issue a response (e.g., RSP_n according to the NVDIMM-P memory protocol) from the memory sub-system 110 (e.g., the NVDIMM-P target) to the host system 120 (e.g., the NVDIMM-P initiator) to indicate that the data (target data) has been written. Additionally, the response can indicate that the memory sub-system 110 is ready to provide the host system 120 with a memory address corresponding to a[b[i]] (based on the two-level dereferencing performed by the memory sub-system controller 115). Accordingly, the response can be followed by the host system 120 issuing a send memory sub-system command (e.g., SEND command according to a NVDIMM-P memory protocol), and the multi-level dereferencing operation executor 113 can cause the memory sub-system controller 115 to respond by sending the read-out data (target data) to the host system 120 (e.g., NVDIMM-P initiator). If the host system 120 is set up so that the data structures a and b are cacheable on the host system 120, then the memory address of a[b[i]] returned by the memory sub-system 110 to the host system 120 can be used to update (e.g., modify or invalidate cache lines of) one or more caches on the host system 120 based on the memory address of a[b[i]].

Further details with regards to the operations of the multi-level dereferencing operation executor 113 and the multi-level dereferencing software 125 are described below.

Figure 2:
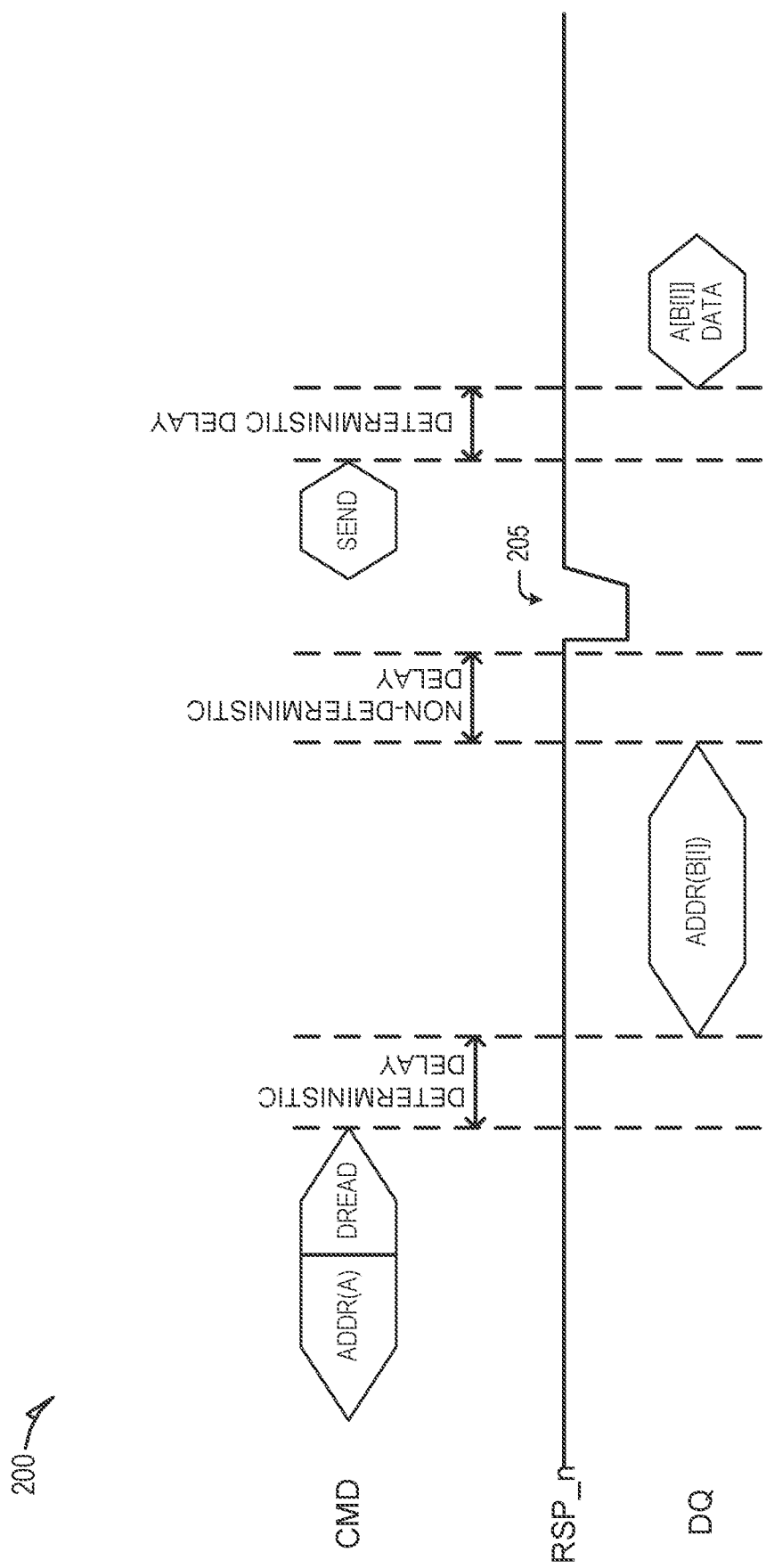
FIGS. 2 and 3 are diagrams illustrating example memory protocols by which a host system requests execution of example memory sub-system-bounded dereferenced operations with respect to a memory sub-system, in accordance with some embodiments of the present disclosure.
Figure 3:
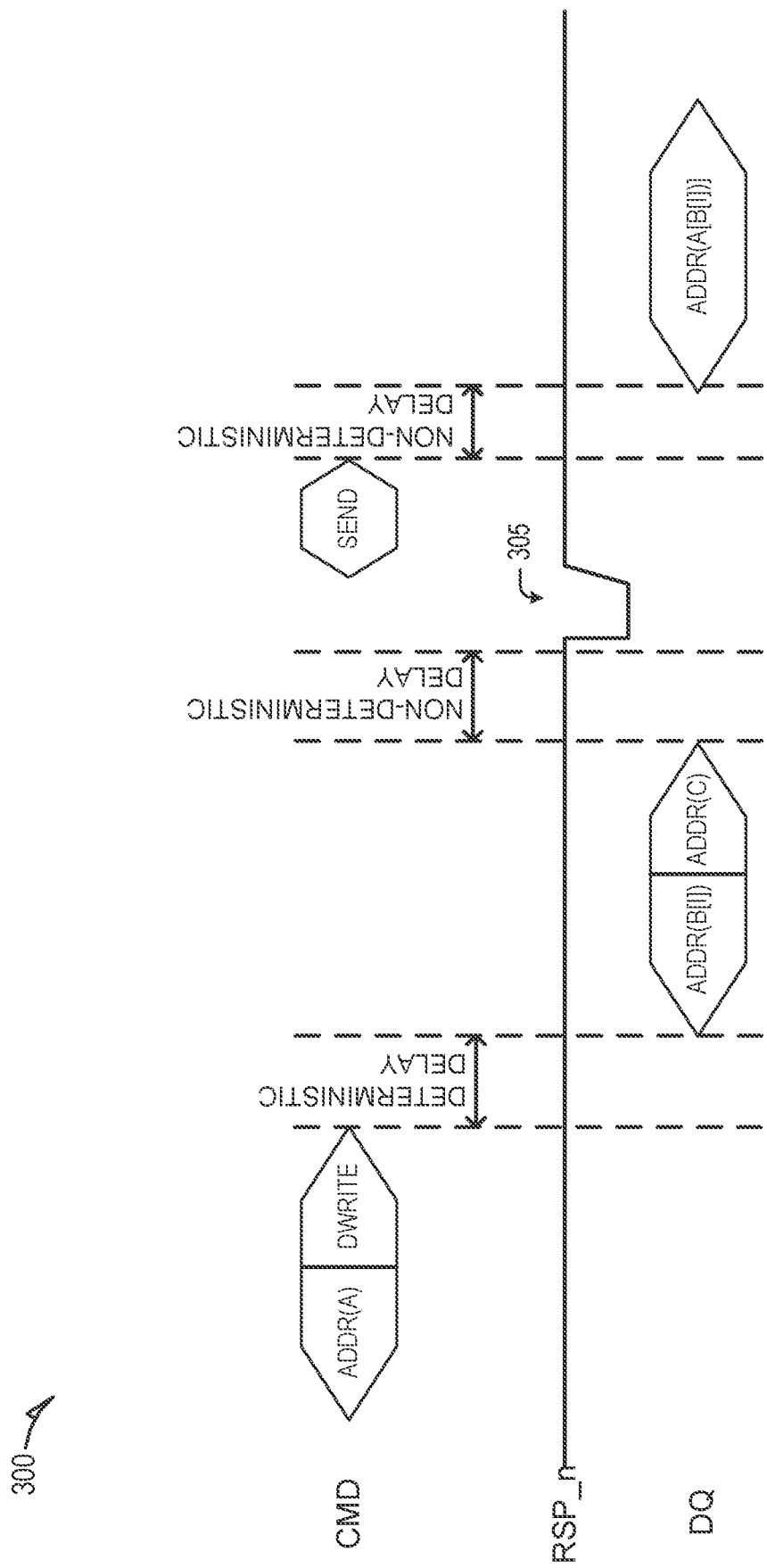

FIGS. 2 and 3 are diagrams illustrating example memory protocols by which a host system requests execution of example memory sub-system-bounded dereferenced operations with respect to a memory sub-system, in accordance with some embodiments of the present disclosure. In particular, FIG. 2 illustrates an example memory sub-system command, in accordance with an example NVDIMM-P memory protocol 200, by which a host system (e.g., 120) requests a memory sub-system (e.g., 110) to perform a dereferenced read operation with respect to two-level dereferencing denoted by a[b[i]] (e.g., c=a[b[i]]). As shown, the requested dereferenced read operation involves a first memory address (ADDR(A)) of a data structure a, a command encoding that corresponds to a dereferenced read operation (DREAD), a second memory address (ADDR(B[i])) of an element i of a data structure b. Though not illustrated, the dereferenced read operation can further involve providing the memory sub-system (e.g., 110) with a data size, a data type, or endian-ness (e.g., Little-endian or Big-endian) of the memory address of one or both of the data structures a and b as part of the example memory sub-system command (e.g., via a METADATA signal line). The dereferenced read operation is requested by a host system sending to the memory sub-system: ADDR(A) and command encoding corresponding to the dereferenced read operation (DREAD) on a command (CMD) signal line; and ADDR (B[I]) on the data (DQ) signal line. The ADDR(B[I]) can be sent on the data (DQ) signal line after a deterministic delay that follows the sending of the ADDR(A) and the command encoding (DREAD) on the command (CMD) signal line. The sending of the ADDR(A), DREAD, and ADDR(B[I]) via the CMD and DQ signal lines represents the sending of an example memory sub-system command to request a dereferenced read operation in accordance with the example NVDIMM-P memory protocol 200. After non-deterministic delay, the memory sub-system responds with a signal 205 on the RSP_n signal line to indicate to the host system that performance of the dereferenced read operation has ended, and the data (target data) read from the memory location corresponding to a[b[i]] by the dereferenced read operation is ready to be sent to the host system. In response to the signal 205, the host system can send a memory sub-system send command (SEND) to the memory sub-system, which the memory sub-system responds to by sending the target data (A[B[I]] DATA) back to the host system on the data (DQ) signal line after a deterministic delay.

FIG. 3 illustrates an example memory sub-system command, in accordance with an example NVDIMM-P memory protocol 300, by which a host system (e.g., 120) requests a memory sub-system (e.g., 110) to perform a dereferenced write operation with respect to two-level dereferencing denoted by a[b[i]] (e.g., a[b[i]]=c). As shown, the requested dereferenced write operation involves a first memory address (ADDR(A)) of a data structure a, a command encoding that corresponds to a dereferenced write operation (DWRITE), a second memory address (ADDR(B[I])) of an element i of a data structure b, and a third memory address (ADDR(C)) of a variable c from which data will be copied. Though not illustrated, the dereferenced write operation can further involve providing the memory sub-system (e.g., 110) with a data size, a data type, or endian-ness (e.g., Little-endian or Big-endian) of the memory address of one or more of the data structures a and b and the variable c as part of the example memory sub-system command (e.g., via a META-DATA signal line). The dereferenced write operation is requested by a host system sending to the memory sub-system: ADDR(A) and command encoding corresponding to the dereferenced write operation (DWRITE) on a command (CMD) signal line; and ADDR(B[I]) and ADDR(C) on the data (DQ) signal line. The ADDR(B[I]) and ADDR(C) can be sent on the data (DQ) signal line after a deterministic delay that follows the sending of the ADDR(A) and the command encoding (DWRITE) on the command (CMD) signal line. The sending of the ADDR(A), DWRITE, ADDR (B[I]), and ADDR(C) via the CMD and DQ signal lines represents the sending of an example memory sub-system command to request a dereferenced write operation in accordance with the example NVDIMM-P memory protocol 300. After non-deterministic delay, the memory sub-system responds with a signal 305 on the RSP_n signal line to indicate to the host system that performance of the dereferenced write operation has ended, and the data (target data) has been read from the memory location corresponding to c and written to the memory location corresponding to a[b[i]] by the dereferenced write operation. For some embodiments, the RSP_n signal line indicates to the host system that the memory sub-system is ready to provide the host system with the memory address corresponding to the location a[b[i]] (as determined as part of the dereferenced write operation). In response to the signal 305, the host system can send a memory sub-system send command (SEND) to the memory sub-system, which the memory sub-system responds to by sending the memory address of a[b[i]] (ADDR(A[B[I]]) back to the host system on the data (DQ) signal line after a deterministic delay.

FIGS. 4 through 8 are flow diagrams of example methods for performing an operation with multi-level pointer (e.g., data structure) dereferencing within a memory sub-system, in accordance with some embodiments of the present disclosure. The methods 400, 500, 600, 700, 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 400, 500, 600, 700 is performed by the memory sub-system controller 115 of FIG. 1 based on the multi-level dereferencing operation executor 113. Additionally, or alternatively, for some embodiments, at least one of the methods 400, 500, 600, 700 is performed, at least in part, by the host system 120. For some embodiments, the method 800 is performed by the host system 120. In some embodiments, the method 800 is performed by the host system 120 based on the multi-level dereferencing software 125. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 4:
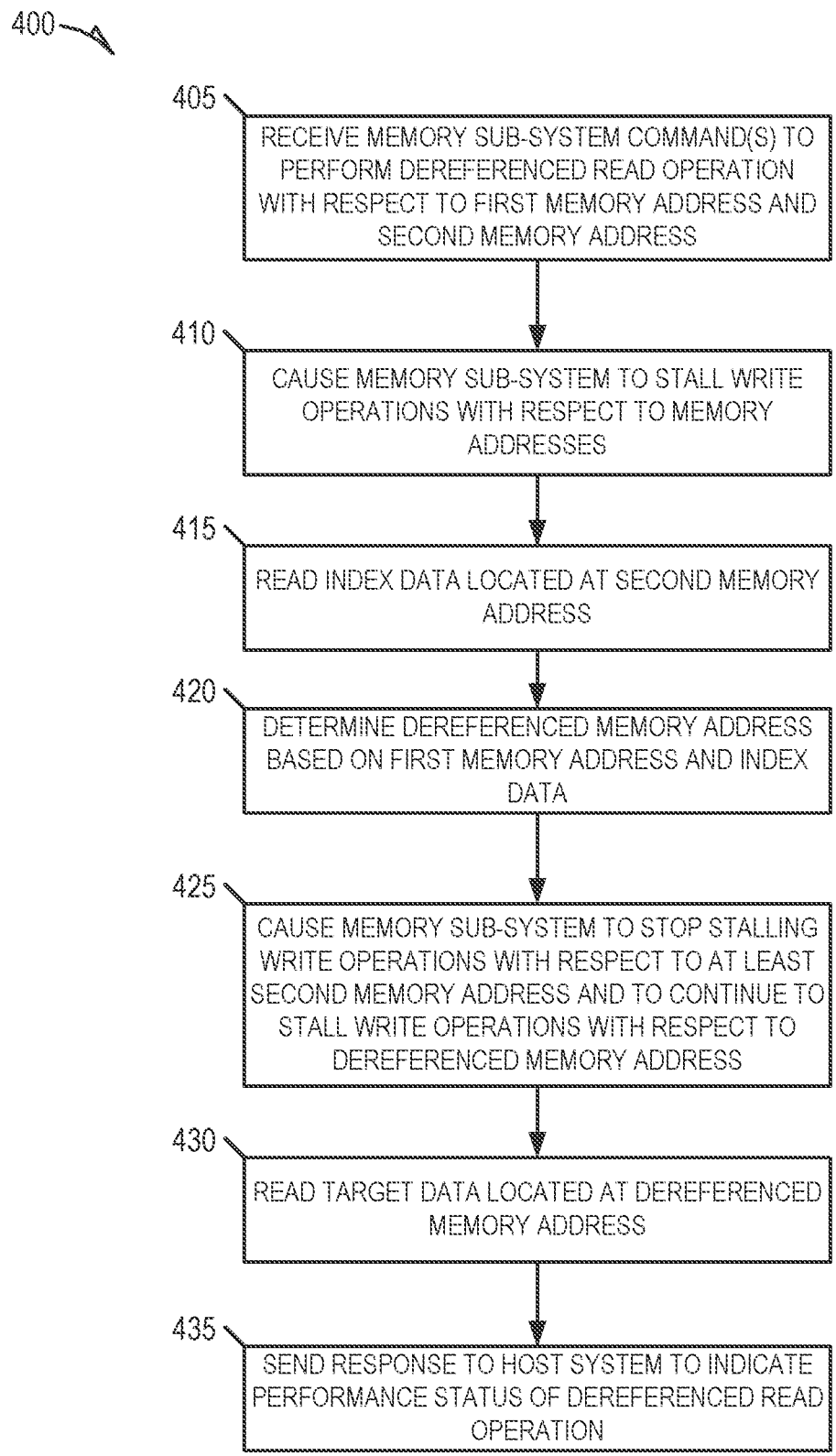
FIGS. 4 through 8 are flow diagrams of example methods for performing an operation with multi-level pointer dereferencing within a memory sub-system, in accordance with some embodiments of the present disclosure.

Referring now to the method 400 of FIG. 4, at operation 405, a processing device (e.g., the processor 117 of the memory sub-system controller 115) receives, from a host system (e.g., 120), one or more memory sub-system commands to perform a dereferenced read operation with respect to a first memory address (e.g., first physical memory address) of the memory sub-system (e.g., 110) and a second memory address (e.g., second physical memory address) of the memory sub-system. For some embodiments, where the dereferenced read operation data is read from a memory location corresponding to a[b[i]] (for an array data structure a and another array data structure b), the first memory address comprises a memory address corresponding to the array data structure a (e.g., memory address of a[ ]), and the second memory address comprises a memory address corresponding to a memory address for data element i of data structure b (e.g., b[i]). For some embodiments, the one or more memory sub-system commands is received from the host system according to a non-deterministic memory protocol, such as a Non-Volatile Dual In-Line Memory Module-P (NVDIMM-P) memory protocol. The one or more memory sub-system commands comprises information indicating a data type or a data size associated with at least one of the first memory address or the second memory address. For instance, data-type bits of a memory protocol (e.g., a NVDIMM-P memory protocol) can be sent with the payload of the one or more memory sub-system commands, and the data-type bits can specify the data-type size (e.g., 64-bit, 32-bit, etc.) of the first memory address, the second memory address, or both.

At operation 410, the processing device (e.g., 117) causes the memory sub-system (e.g., 110) to stall (temporarily) write operations with respect to memory addresses associated with any memory sub-system command received after the one or more memory sub-system commands (which are received at operation 405). In doing so, operation 410 can prevent data stored in the memory locations corresponding to a[b[i]] and b[i] from being overwritten or modified prior to the data being read out from those memory locations. Where the memory sub-system comprises a cache (e.g., the front-end cache 150) operatively coupled to the one or more memory devices, and the cache comprises one or more command queues, operation 410 can comprise stalling, in the one or more command queues, any command queue that has a write operation as a next command, which effectively (via the cache) prevents data stored in the memory locations of corresponding to a[b[i]] and b[i] from being overwritten or modified.

At operation 415, the processing device (e.g., 117) reads, from the one or more memory devices (e.g., 130, 140), index data located at the second memory address (e.g., corresponding to data structure element b[i]). For some embodiments, operation 415 is performed only after operation 410 is performed. Where the memory sub-system comprises a cache (e.g., the front-end cache 150) operatively coupled to the one or more memory devices, prior to reading the index data located at the second memory address, operation 415 comprises the processing device determining whether the index data located at the second memory address is currently stored in the cache, and in response to determining that the index data located at the second memory address is currently stored in the cache, reading the index data from the cache. Alternatively, in response to determining that the index data located at the second memory address is not currently stored in the cache, the processing device can cause the index data located at the second memory address to be copied from the one or more memory devices to the cache; and can then read the index data from the cache.

For operation 415, where the cache comprises a plurality of cache lines and one or more command queues, causing the index data located at the second memory address to be copied from the one or more memory devices to the cache can comprise the processing device determining whether any command queues of the one or more command queues is assigned (e.g., via a memory address tag) to a particular cache line associated with the second memory address (e.g., corresponding to data structure element b[i]). In response to determining that a particular command queue of the one or more command queues is assigned (e.g., via a memory address tag) to the particular cache line, the processing device can cause a read command to be sent to the particular command queue, where the read command causes the index data to be copied from the one or more memory devices to the particular cache line. Alternatively, in response to determining that no command queue of the one or more command queues is assigned to the particular cache line, the cache can assign an available command queue (of the one or more command queues) to the particular cache line and the processing device can send the assigned command queue a read command that causes the index data to be copied from the one or more memory devices to the particular cache line.

At operation 420, the processing device (e.g., 117) determines a dereferenced memory address based on the first memory address and the index data (provided by operation 415). In particular, the processing device can determine the dereferenced memory address by offsetting the first memory address by a value provided by the index data.

At operation 425, the processing device (e.g., 117) causes the memory sub-system (e.g., 110) to stop stalling write operations with respect to at least the second memory address and to continue to stall write operations with respect to at least the dereferenced memory address. In doing so, operation 425 can prevent data stored in the memory locations of corresponding to a[b[i]] from being overwritten or modified prior to the data being read out from that memory location, and can at least enable write operations (e.g., allow them to resume) with respect to the memory location corresponding to b[i]. Where the memory sub-system comprises a cache (e.g., the front-end cache 150) operatively coupled to the one or more memory devices, prior to reading the index data located at the second memory address, operation 425 comprises the processing device causing a particular command queue, in the one or more command queues, associated with at least the second memory address and not associated with the dereferenced memory address to stop stalling.

At operation 430, the processing device (e.g., 117) reads, from the one or more memory devices (e.g., 130, 140), target data located at the dereferenced memory address (e.g., corresponding to data structure element a[b[i]]). At operation 435, the processing device (e.g., 117) sends a response to the host system (e.g., 120) that indicates a performance status of the dereferenced read operation. For some embodiments, the response comprises a response signal (e.g., assertion of RSP_n) in accordance with a memory protocol, such as a non-deterministic memory protocol (e.g., a NVDIMM-P memory protocol). Additionally, for some embodiments, the response identifies the one or more memory sub-system commands that have completed performance on the memory sub-system (e.g., 110), thereby enabling the host system 120 to update related information on the host system-side.

Figure 5:
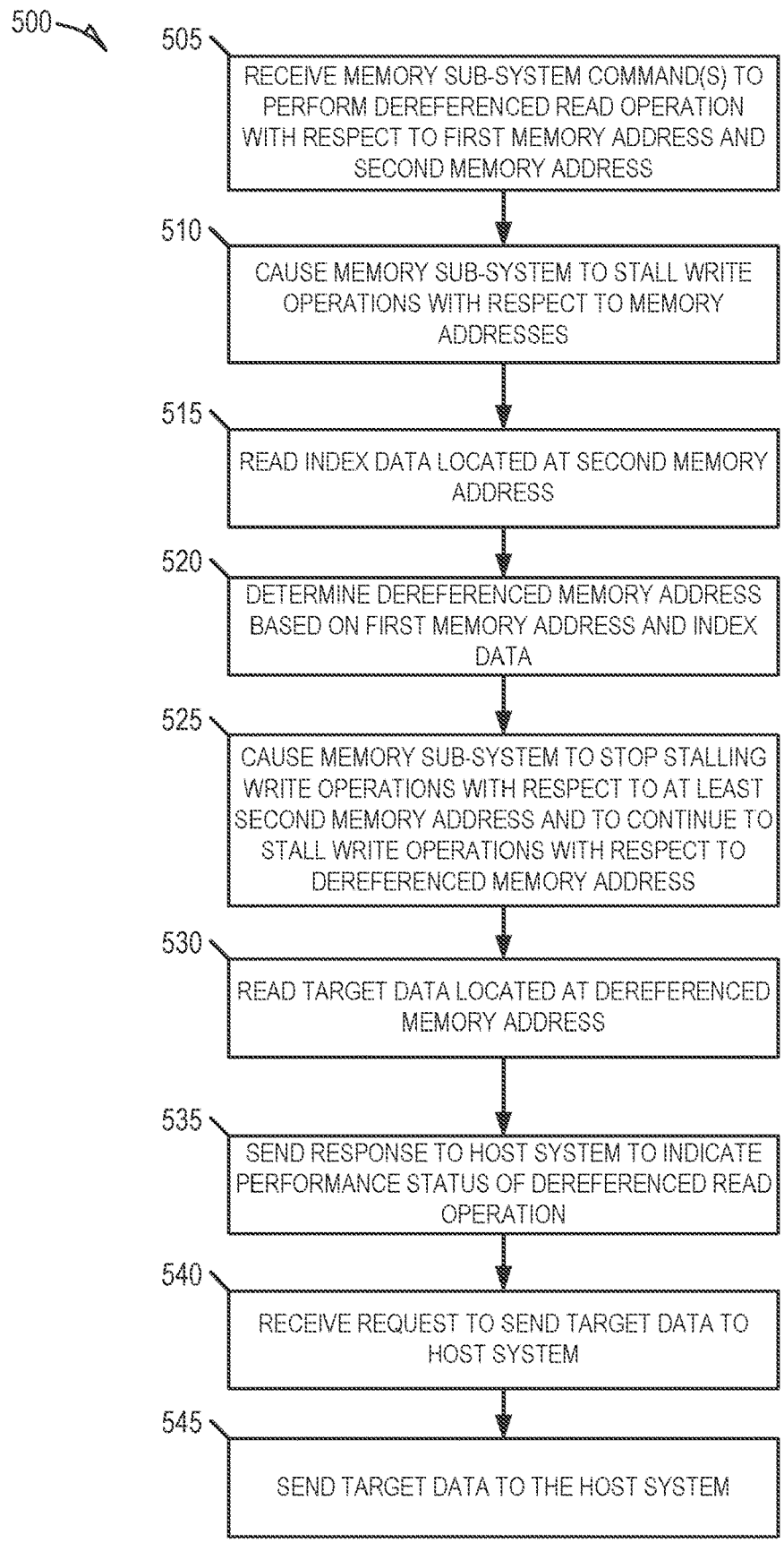

Referring now to the method 500 of FIG. 5, for some embodiments, operations 505 through 535 are respectively similar to operations 405 through 435 of the method 400 described above with respect to FIG. 4. At operation 540, the processing device (e.g., 117) receives, from the host system (e.g., 120), a request to send the target data to the host system. For some embodiments, the request to send is according to a non-deterministic memory protocol, such as a NVDIMM-P memory protocol. For instance, the request to send can comprise a SEND memory sub-system command as specified by a NVDIMM-P memory protocol.

At operation 545, the processing device (e.g., 117) sends the target data to the host system (e.g., 120) in response to receiving the request to send at operation 540. For some embodiments, the target data is sent to the host system according to a non-deterministic memory protocol, such as a NVDIMM-P memory protocol. For instance, the target data can be sent to the host system over a data (DQ) signal line, in response to a SEND memory sub-system command from the host system, in accordance with a NVDIMM-P memory protocol.

Figure 6:
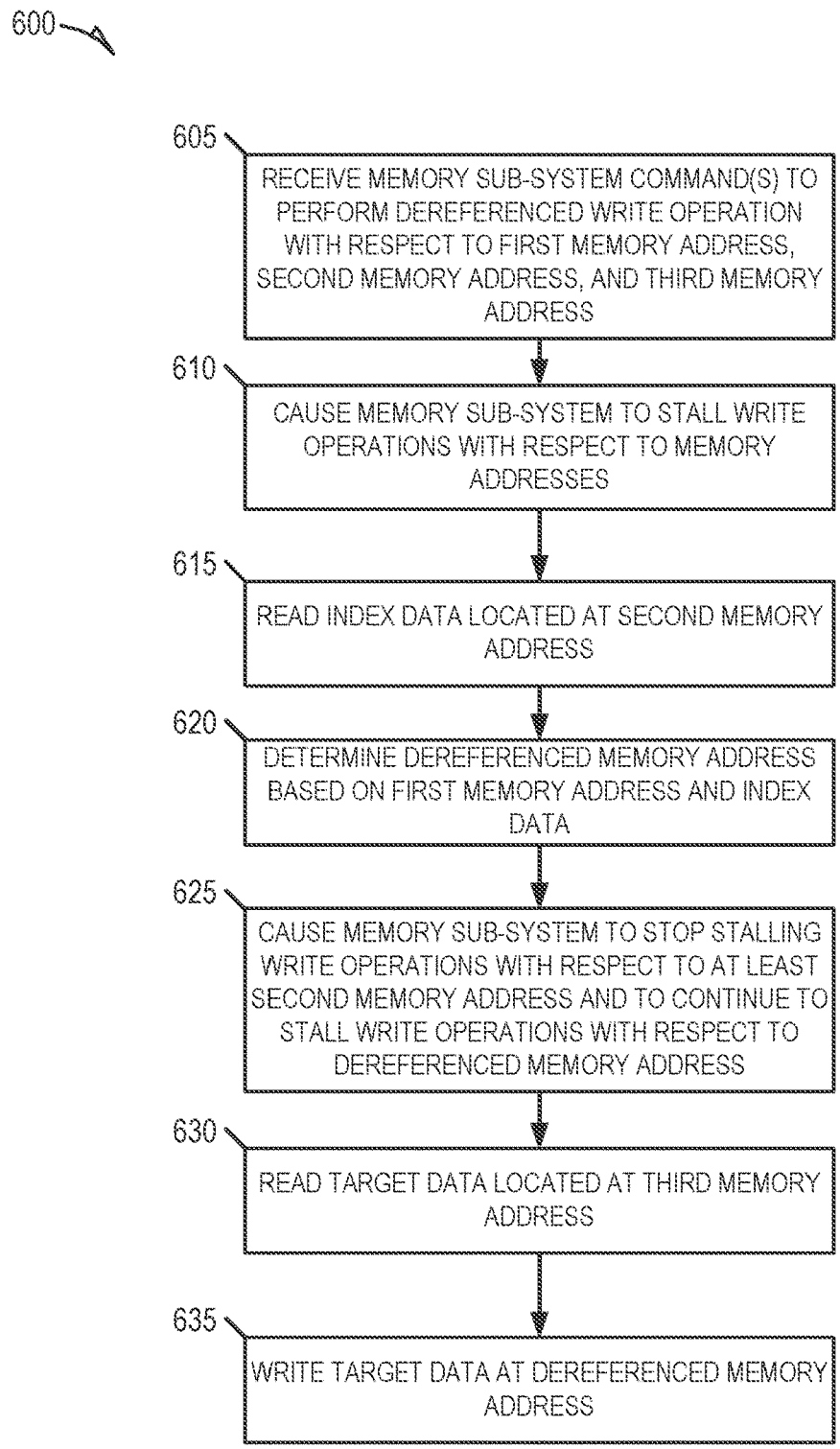

Referring now to the method 600 of FIG. 6, at operation 605, a processing device (e.g., the processor 117 of the memory sub-system controller 115) receives, from a host system (e.g., 120), one or more memory sub-system commands to perform a dereferenced write operation with respect to a first memory address of the memory sub-system (e.g., 110), a second memory address of the memory sub-system, and a third memory address of the memory sub-system. For some embodiments, where the dereferenced write operation is copying data (target data) from a variable c to a memory location corresponding to a[b[i]] (for an array data structure a and another array data structure b), the first memory address comprises a memory address corresponding to the array data structure a (e.g., memory address of a[ ]), the second memory address comprises a memory address corresponding to a memory address for data element i of data structure b (e.g., b[i]), and the third memory address comprises a memory address corresponding to the variable c.

At operation 610, the processing device (e.g., 117) causes the memory sub-system (e.g., 110) to stall (temporarily) write operations with respect to memory addresses associated with any memory sub-system command that is received after the one or more memory sub-system commands (which are received at operation 605). For some embodiments, operation 610 is similar to operation 410 described above with respect to the method 400 of FIG. 4.

At operation 615, the processing device (e.g., 117) reads, from the one or more memory devices (e.g., 130, 140), index data located at the second memory address. For some embodiments, operation 615 is performed only after operation 610 is performed. Additionally, for some embodiments, operation 615 is similar to operation 415 described above with respect to the method 400 of FIG. 4.

At operation 620, the processing device (e.g., 117) determines a dereferenced memory address based on the first memory address and the index data. In particular, the processing device can determine the dereferenced memory address by offsetting the first memory address by a value provided by the index data.

At operation 625, the processing device (e.g., 117) causes the memory sub-system (e.g., 110) to stop stalling write operations with respect to at least the second memory address and to continue to stall write operations with respect to at least the dereferenced memory address. For some embodiments, operation 625 is similar to operation 425 described above with respect to the method 400 of FIG. 4.

At operation 630, the processing device (e.g., 117) reads, from the one or more memory devices (e.g., 130, 140), target data located at the third memory address (e.g., corresponding to variable c). As described herein, the memory location associated with the third memory address provides the target data that is to be copied to the memory location associated with the dereferenced memory address (determined by operation 620). At operation 635, the processing device (e.g., 117) writes the target data to the one or more memory devices (e.g., 130, 140) at the dereferenced memory address (e.g., corresponding to data structure element a[b[i]]).

Figure 7:
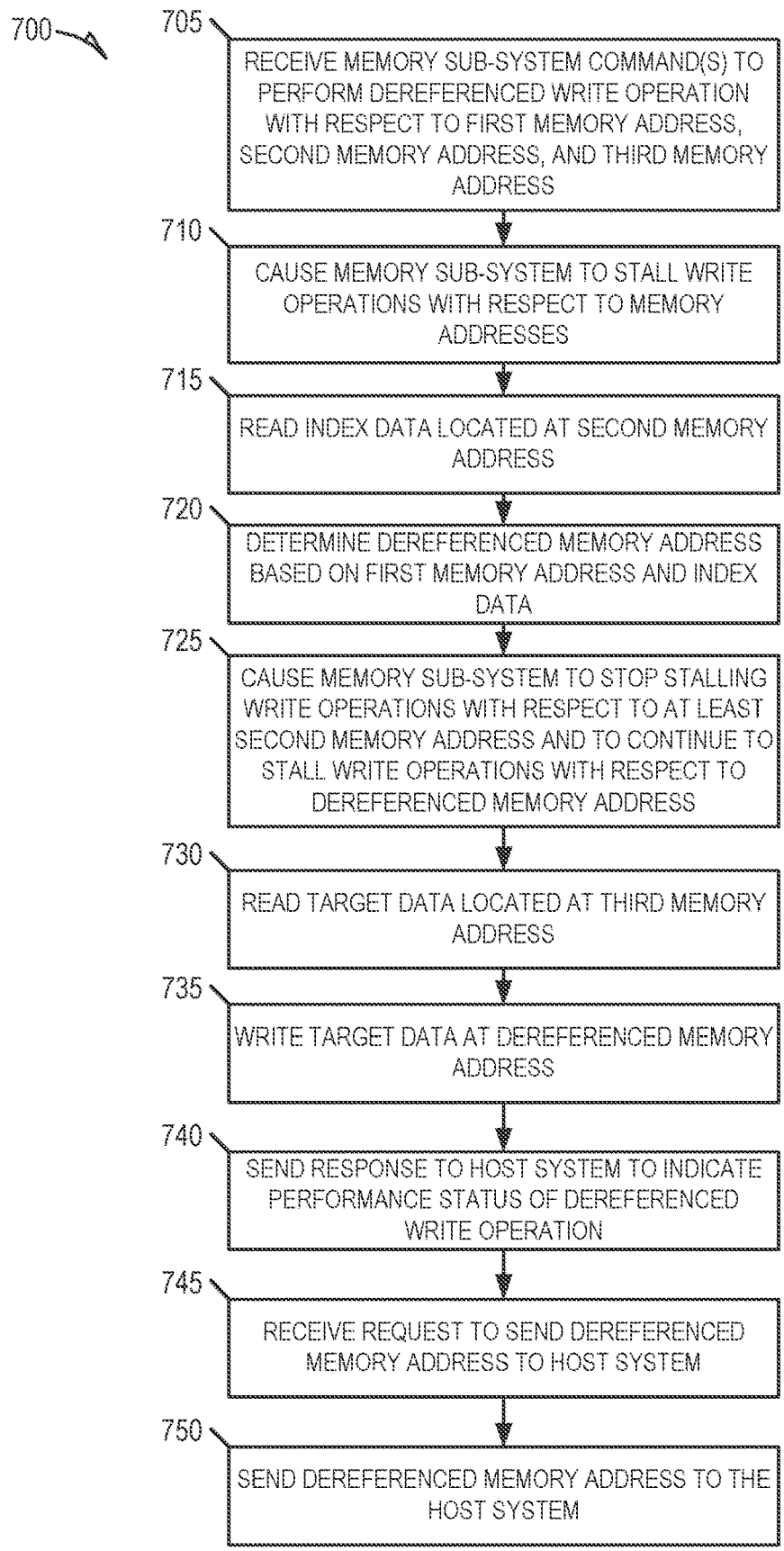

Referring now to the method 700 of FIG. 7, for some embodiments, operations 705 through 735 are respectively similar to operations 605 through 635 of the method 600 described above with respect to FIG. 6.

At operation 740, the processing device (e.g., 117) sends a response to the host system (e.g., 120) that indicates a performance status of the dereferenced write operation. For some embodiments, the response comprises a response signal (e.g., assertion of RSP_n) in accordance with a memory protocol, such as a non-deterministic memory protocol (e.g., a NVDIMM-P memory protocol). Additionally, for some embodiments, the response identifies the one or more memory sub-system commands that have completed performance on the memory sub-system (e.g., 110), thereby enabling the host system 120 to update related information on the host system-side.

At operation 745, the processing device (e.g., 117) receives, from the host system (e.g., 120), a request to send the dereferenced memory address (e.g., corresponding to data structure element a[b[i]] to the host system. For some embodiments, the request to send is according to a non-deterministic memory protocol, such as a NVDIMM-P memory protocol. For instance, the request to send can comprise a SEND memory sub-system command as specified by a NVDIMM-P memory protocol. As described herein, the dereferenced memory address returned by the memory sub-system to the host system can be used by the host system to update (e.g., modify or invalidate cache lines of) one or more caches on the host system based on the dereferenced memory address.

At operation 750, the processing device (e.g., 117) sends the dereferenced memory address to the host system (e.g., 120) in response to receiving the request to send at operation 745. For some embodiments, the dereferenced memory address is sent to the host system according to a non-deterministic memory protocol, such as a NVDIMM-P memory protocol. For instance, the dereferenced memory address can be sent to the host system over a data (DQ) signal line, in response to a SEND memory sub-system command from the host system, in accordance with a NVDIMM-P memory protocol.

Figure 8:
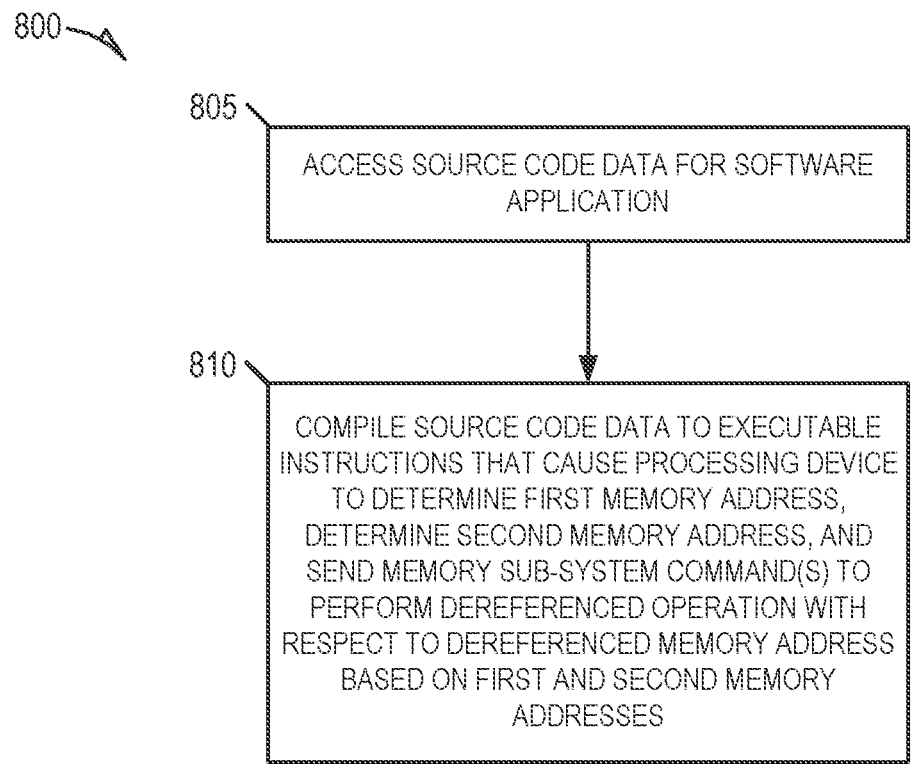

Referring now to the method 800 of FIG. 8, at operation 805, a processing device (e.g., a processor of the host system 120) accesses source code data for a software application. For some embodiments, the source code data comprises at least one programming language statement to perform a read operation, or a write operation, with respect to a memory address determined by dereferencing (e.g., two level dereferencing) at least a first data structure and a second data structure. At operation 810, the processing device (e.g., a processor of the host system 120) compiles the source code data to executable instructions for the processing device, where the executable instructions comprise at least one executable instruction that causes the processing device to perform dereferencing (e.g., two-level dereferencing) of at least the first data structure and the second data structure in accordance with various embodiments described herein. For some embodiments, the processing device determines the first memory address by performing a first virtual memory address-to-physical memory address translation based on a first virtual memory address associated with the first data structure. Additionally, for some embodiments, the processing device determines the second memory address by performing a second virtual memory address-to-physical memory address translation based on a second virtual memory address associated with the second data structure.

Figure 9A:
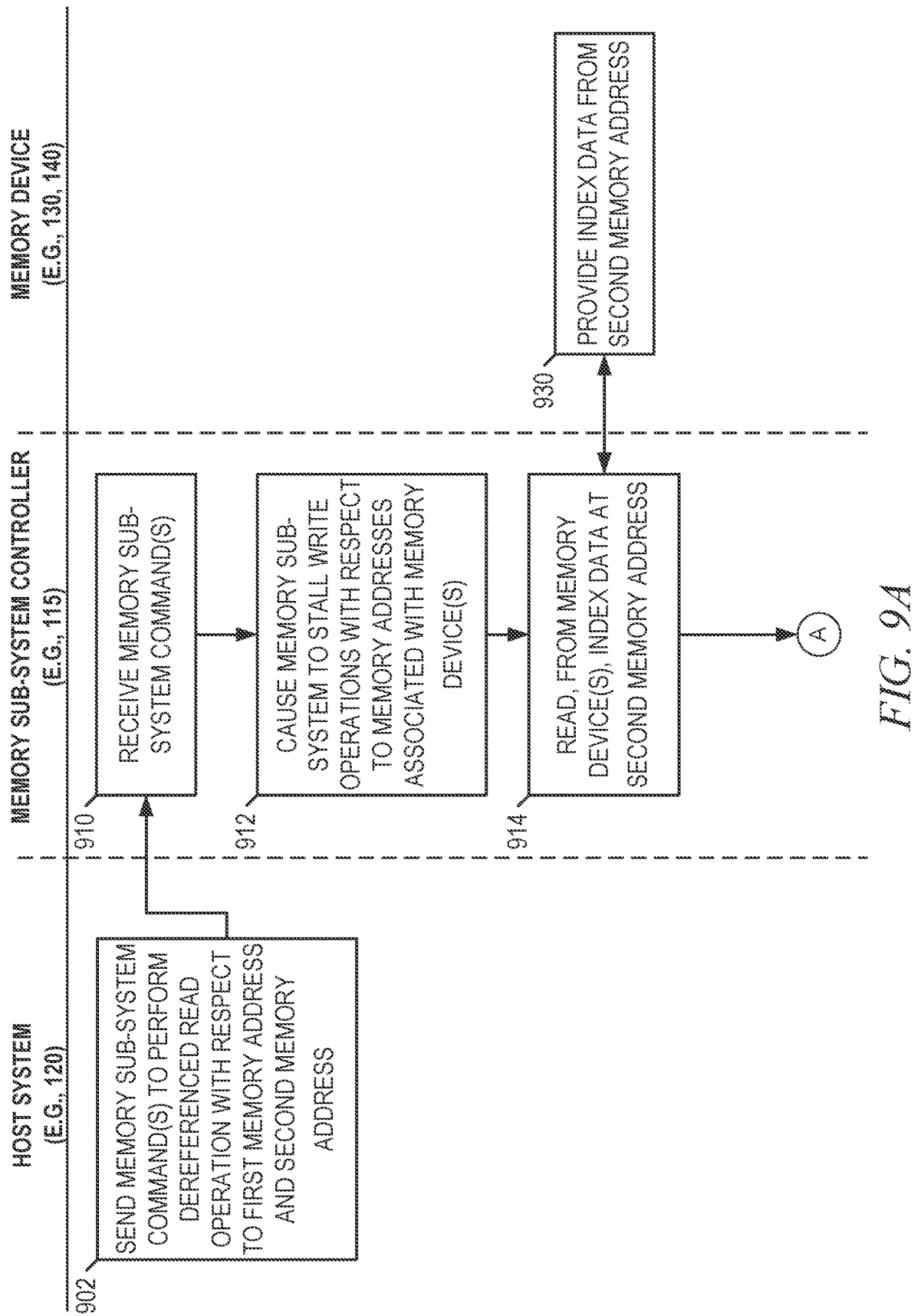
FIGS. 9A through 9C provide an interaction diagram illustrating interactions between components of the computing environment in the context of some embodiments in which a method for performing a read operation with multi-level pointer dereferencing within a memory sub-system is performed.
Figure 9B:
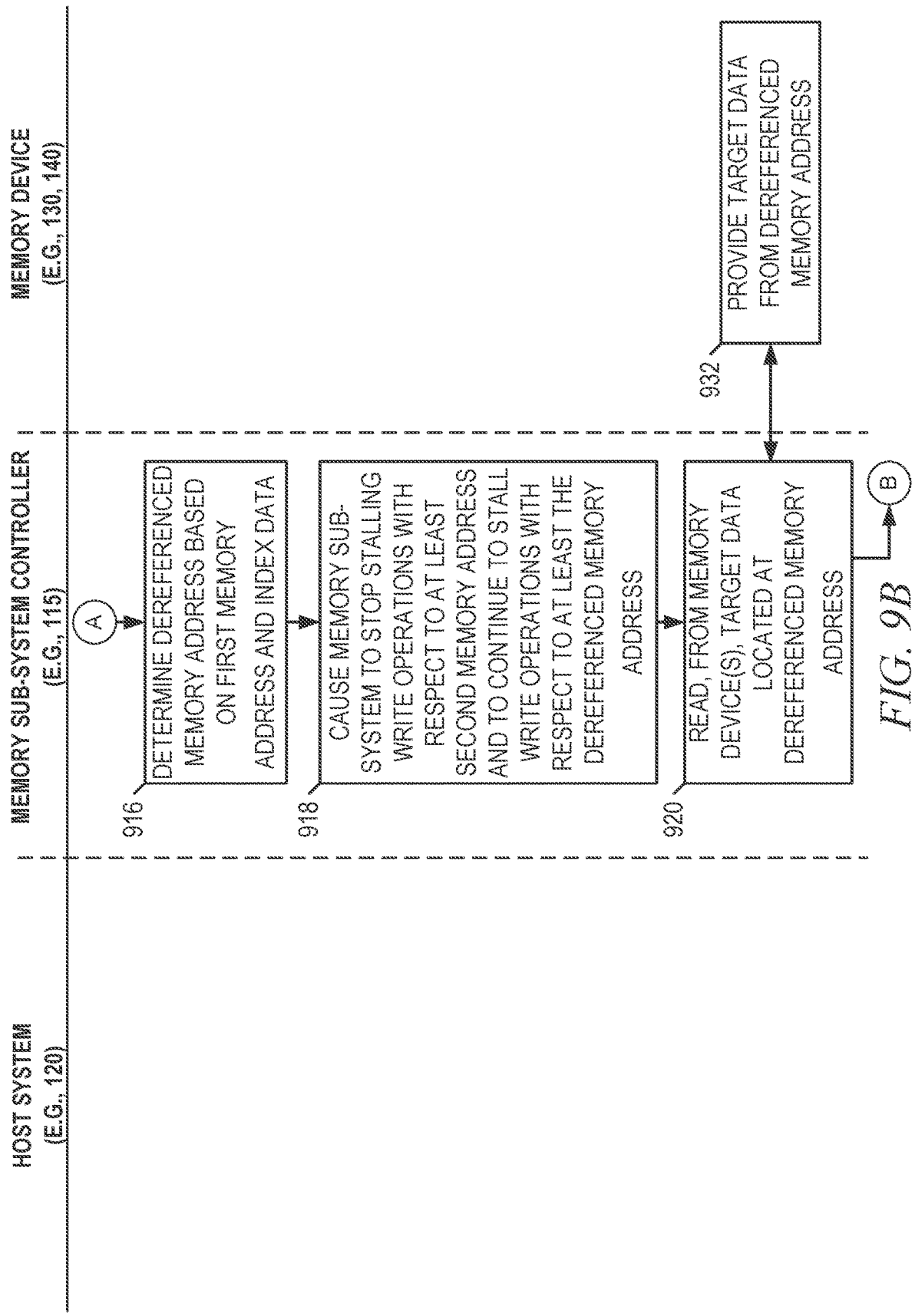
Figure 9C:
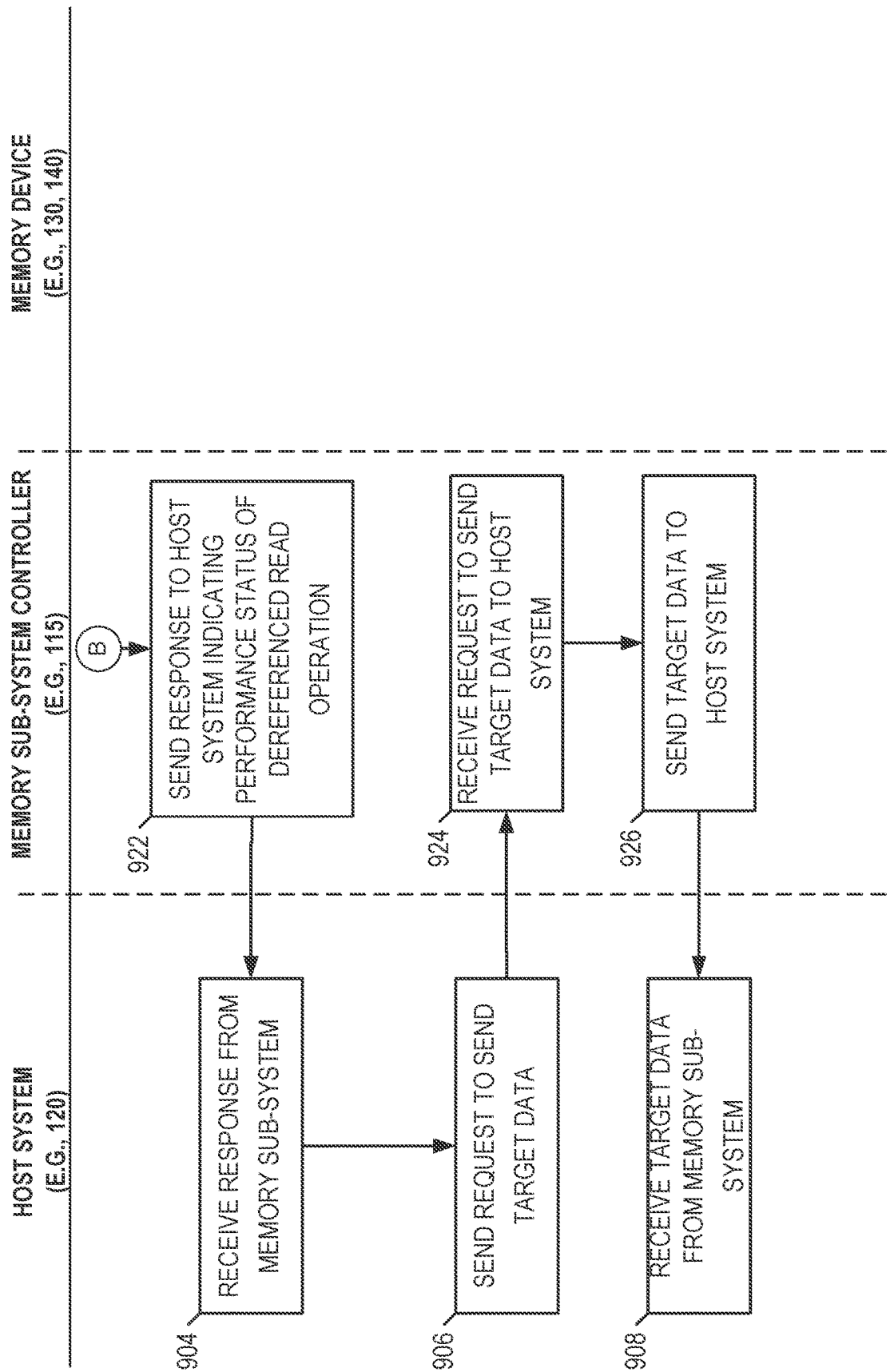

FIGS. 9A through 9C provide an interaction diagram illustrating interactions between components of the computing environment 100 in the context of some embodiments in which a method for performing a read operation with multi-level pointer (e.g., data structure) dereferencing within a memory sub-system is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130, 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. In the context of the example illustrated in FIGS. 9A through 9C, the host system can include the host system 120, the memory sub-system controller can include the memory sub-system controller 115, and the memory device can include the memory device 130 or 140.

As shown in FIG. 9A, at operation 902, the host system 120 sends one or more memory sub-system commands to the memory sub-system 110 to perform dereferenced read operation with respect to a first memory address (e.g., for a[ ]) and a second memory address (e.g., for b[i]). The one or more memory sub-system commands are conveyed by the host system 120 to the memory sub-system 110 in accordance with a memory protocol, such as a non-deterministic memory protocol (e.g., NVDIMM-P memory protocol). At operation 910, the memory sub-system controller 115 receives the one or more memory sub-system commands that requests performance of a dereferenced read operation with respect to the first memory address and the second memory address. At operation 912, the memory sub-system controller 115 causes the memory sub-system 110 to stall write operations with respect to memory addresses associated any memory sub-system command received after the one or more memory sub-system commands (which are received at operation 910). At operation 914, the memory sub-system controller 115 reads, from the one or more memory devices (e.g., 130, 140), index data at second memory address (e.g., for b[i]). In response, at operation 930, the one or more memory devices (e.g., 130, 140)

provide the index data from a memory location on the one or more memory devices corresponding to the second memory address.

Referring now to FIG. 9B, at operation 916, the memory sub-system controller 115 determines a dereferenced memory address (e.g., for a[b[i]]) based on the first memory address (e.g., for a[ ]) and the index data (read by operation 914). At operation 918, the memory sub-system controller 115 causes the memory sub-system 110 to stop stalling write operations with respect to at least the second memory address and to continue to stall write operations with respect to at least the dereferenced memory address. At operation 920, the memory sub-system controller 115 reads, from the one or more memory devices (e.g., 130, 140), target data located at the dereferenced memory address (determined by operation 916). In response, at operation 932, the one or more memory devices (e.g., 130, 140) provide the target data from a memory location on the one or more memory devices corresponding to the dereferenced memory address.

Referring now to FIG. 9C, at operation 922, the memory sub-system controller 115 sends a response to the host system 120 indicating a performance status of the dereferenced read operation (performed by the memory sub-system controller 115). In response, at operation 904, the host system 120 receives the response from the memory sub-system 110. At operation 906, the host system 120 sends a request, to the memory sub-system 110, to send the target data. In response, at operation 924, the memory sub-system controller 115 receives the request to send the target data to the host system 120. In response, at operation 926, the memory sub-system controller 115 sends the target data to the host system 120. In response, at operation 908, the host system 120 receives the target data from the memory sub-system 110.

Figure 10A:
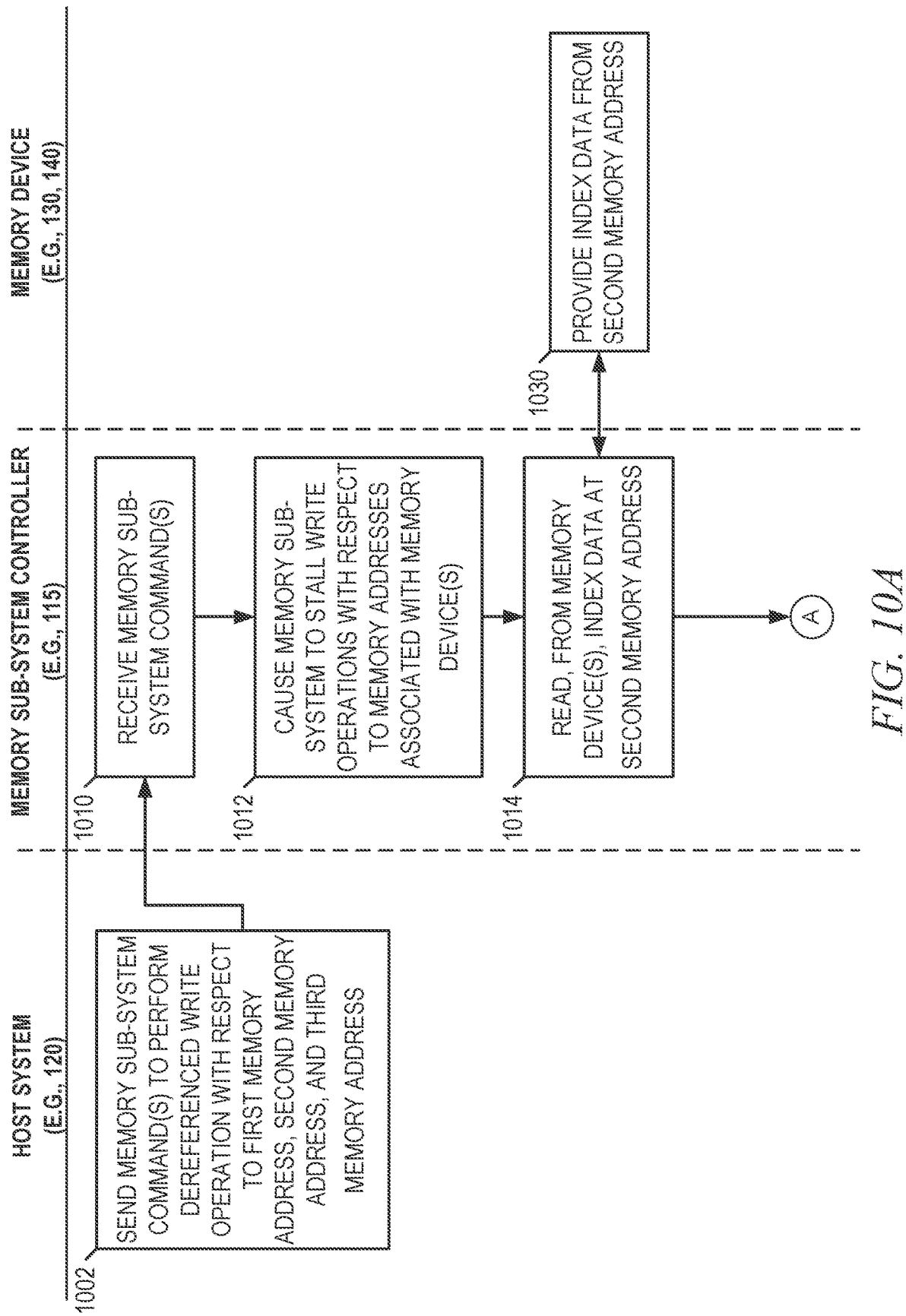
FIGS. 10A through 10C provide an interaction diagram illustrating interactions between components of the computing environment in the context of some embodiments in which a method for performing a write operation with multi-level pointer dereferencing within a memory sub-system is performed.
Figure 10B:
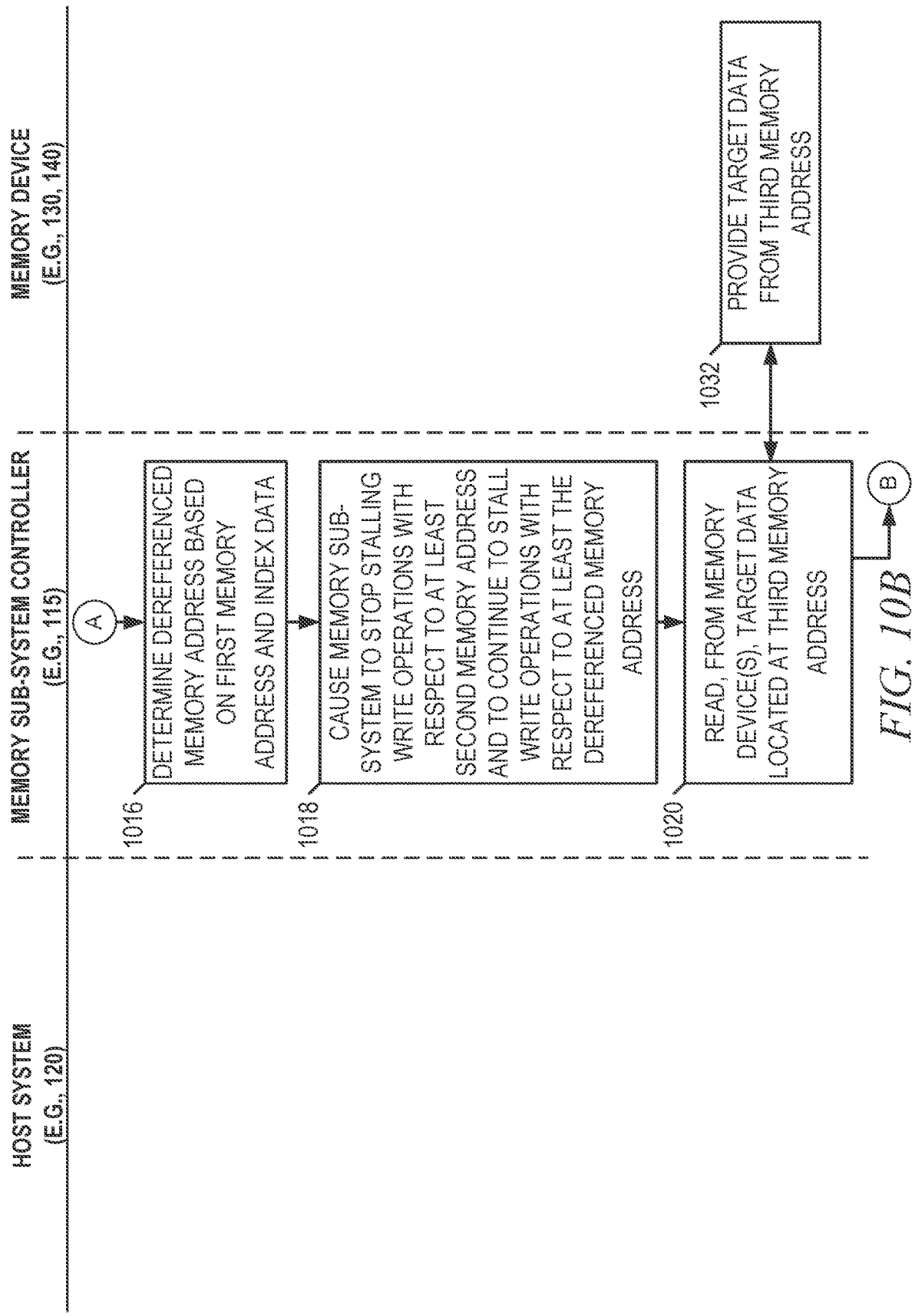
Figure 10C:
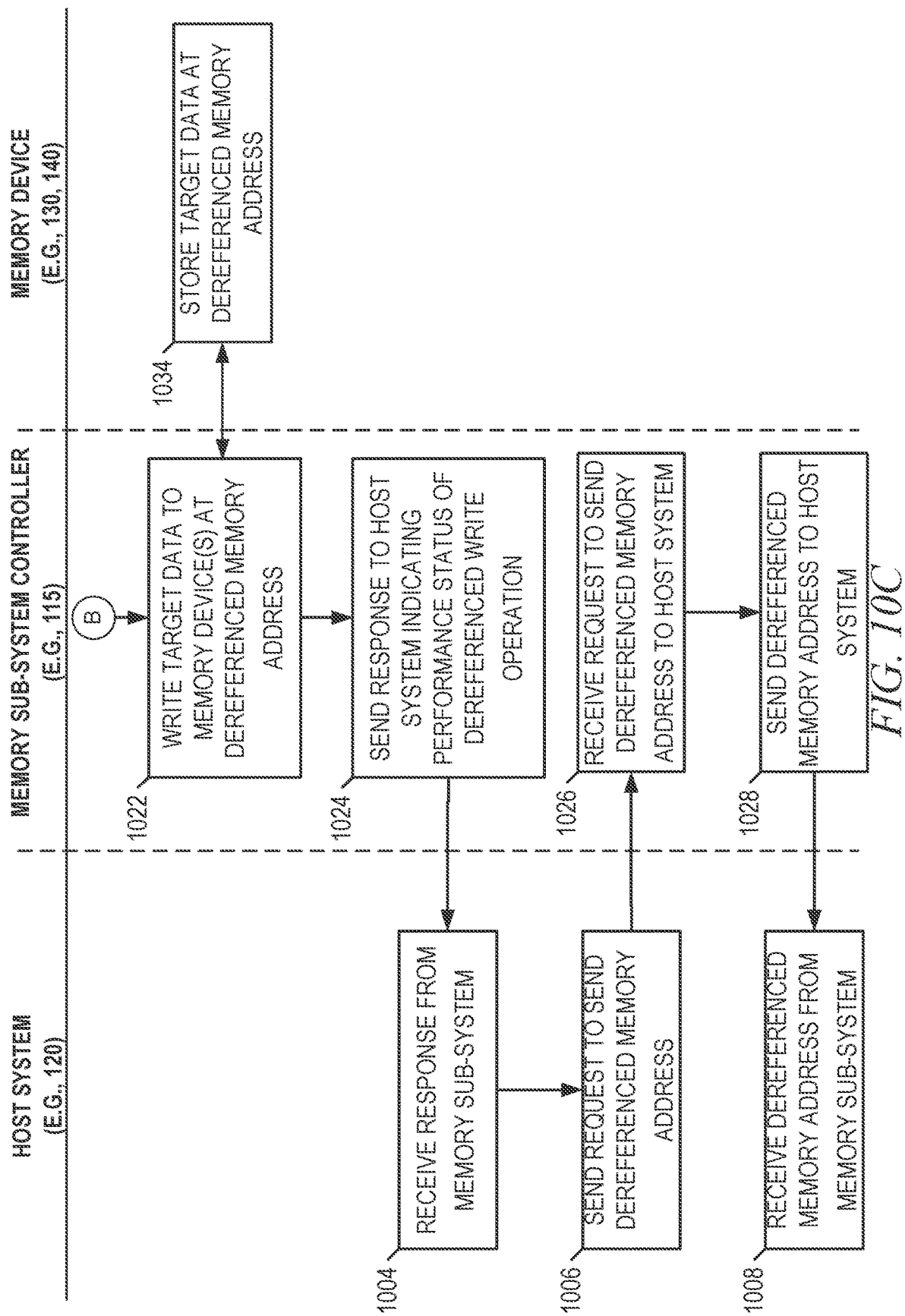

FIGS. 10A through 10C provide an interaction diagram illustrating interactions between components of the computing environment 100 in the context of some embodiments in which a method for performing a write operation with multi-level pointer (e.g., data structure) dereferencing within a memory sub-system is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130, 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. In the context of the example illustrated in FIGS. 10A through 10C, the host system can include the host system 120, the memory sub-system controller can include the memory sub-system controller 115, and the memory device can include the memory device 130 or 140.

As shown in FIG. 10A, at operation 1002, the host system 120 sends one or more memory sub-system commands to the memory sub-system 110 to perform dereferenced write operation with respect to a first memory address (e.g., for a[ ]), a second memory address (e.g., for b[i]), and a third memory address (e.g., for variable c). The one or more memory sub-system commands are conveyed by the host system 120 to the memory sub-system 110 in accordance with a memory protocol, such as a non-deterministic memory protocol (e.g., NVDIMM-P memory protocol). At operation 1010, the memory sub-system controller 115 receives the one or more memory sub-system commands that requests performance of a dereferenced write operation with respect to the first memory address, the second memory address, and the third memory address. At operation 1012, the memory sub-system controller 115 causes the memory sub-system 110 to stall write operations with respect to memory addresses associated with any memory sub-system command received after the one or more memory sub-system commands (which are received at operation 1010). At operation 1014, the memory sub-system controller 115 reads, from the one or more memory devices (e.g., 130, 140), index data at the second memory address (e.g., for b[i]). In response, at operation 1030, the one or more memory devices (e.g., 130, 140) provide the index data from a memory location on the one or more memory devices corresponding to the second memory address.

Referring now to FIG. 10B, at operation 1016, the memory sub-system controller 115 determines a dereferenced memory address (e.g., for a[b[i]]) based on the first memory address (e.g., for a[ ]) and the index data (read by operation 1014). At operation 1018, the memory sub-system controller 115 causes the memory sub-system 110 to stop stalling write operations with respect to at least the second memory address and to continue to stall write operations with respect to at least the dereferenced memory address. At operation 1020, the memory sub-system controller 115 reads, from the one or more memory devices (e.g., 130, 140), target data located at the third memory address (e.g., for variable c). In response, at operation 1032, the one or more memory devices (e.g., 130, 140) provide the target data from a memory location on the one or more memory devices corresponding to the third memory address.

Referring now to FIG. 10C, at operation 1022, the memory sub-system controller 115 writes the target data (from the third memory address) to the one or more memory devices (e.g., 130, 140) at the dereferenced memory address (determined by operation 1016). In response, at operation 1034, the one or more memory devices (e.g., 130, 140) store the target data written to a memory location on the one or more memory devices corresponding to the dereferenced memory address. At operation 1024, the memory sub-system controller 115 sends a response to the host system 120 indicating a performance status of the dereferenced write operation (performed by the memory sub-system controller 115). In response, at operation 1004, the host system 120 receives the response from the memory sub-system 110. At operation 1006, the host system 120 sends a request, to the memory sub-system 110, to send the dereferenced memory address. In response, at operation 1026, the memory sub-system controller 115 receives the request to send the dereferenced memory address to the host system 120 (e.g., which the host system 120 can use to update one or more caches on the host system 120). In response, at operation 1028, the memory sub-system controller 115 sends the dereferenced memory address to the host system 120. In response, at operation 1008, the host system 120 receives the dereferenced memory address from the memory sub-system 110.

Figure 11:
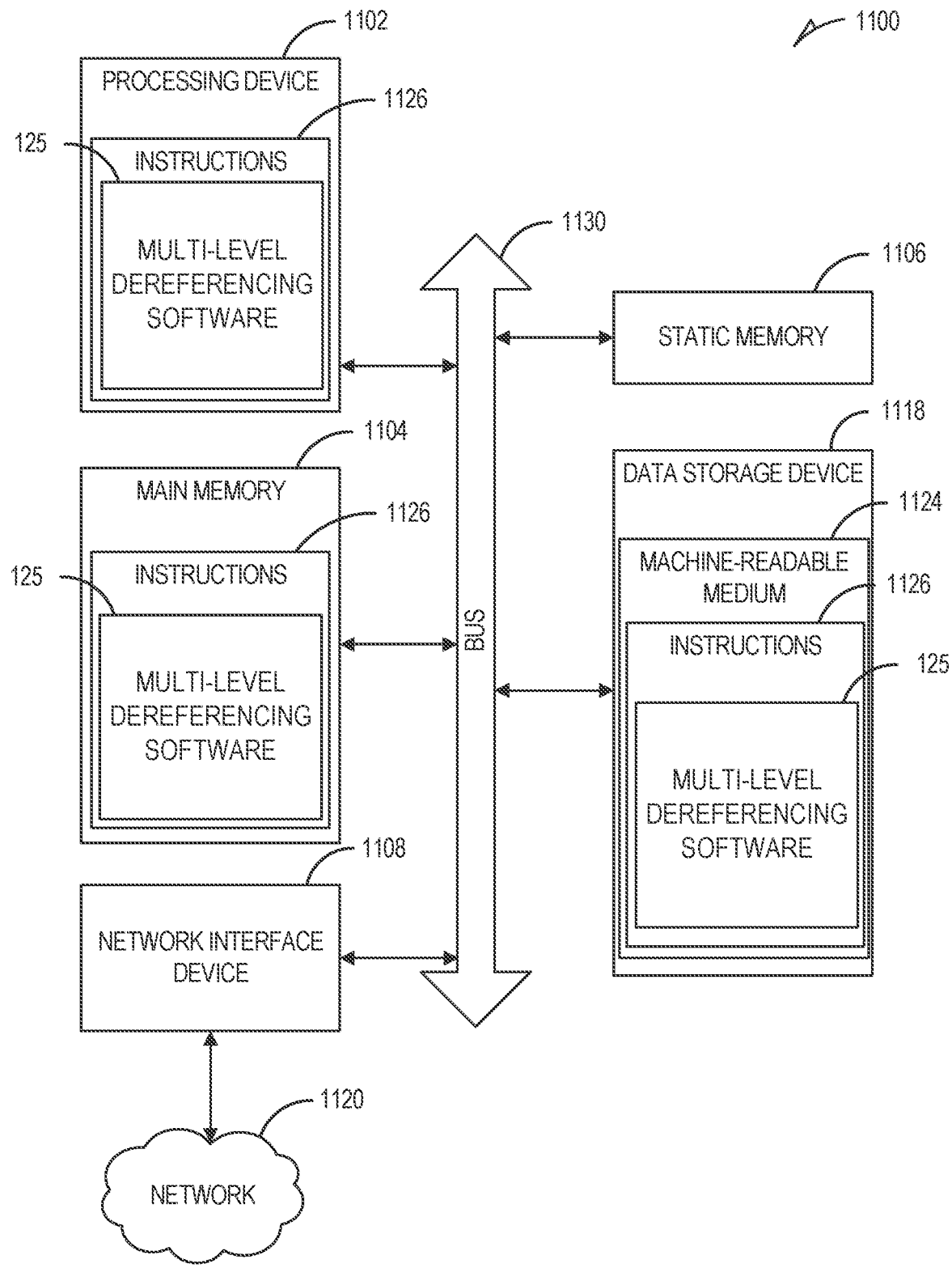
FIG. 11 is a block diagram of an example computer system in which embodiments of the present disclosure may operate.

FIG. 11 illustrates an example machine in the form of a computer system 1100 within which a set of instructions can be executed for causing the machine to perform any one or more of the methodologies discussed herein. In some embodiments, the computer system 1100 can correspond to a host system (e.g., the host system 120 of FIG. 1) that includes, is coupled to, or utilizes a memory sub-system (e.g., the memory sub-system 110 of FIG. 1) or can be used to perform the operations described herein (e.g., to execute an operating system to perform operations corresponding to the multi-level dereferencing software 125 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a data storage device 1118, which communicate with each other via a bus 1130.

The processing device 1102 represents one or more general-purpose processing devices such as a microprocessor, a central processing unit, or the like. More particularly, the processing device 1102 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1102 can also be one or more special-purpose processing devices such as an application specific integrated circuit (ASIC), a field programmable gate array (FPGA), a digital signal processor (DSP), a network processor, or the like. The processing device 1102 is configured to execute instructions 1126 for performing the operations and steps discussed herein. The computer system 1100 can further include a network interface device 1108 to communicate over a network 1120.

The data storage device 1118 can include a machine-readable storage medium 1124 (also known as a computer-readable medium) on which is stored one or more sets of instructions 1126 or software embodying any one or more of the methodologies or functions described herein. The instructions 1126 can also reside, completely or at least partially, within the main memory 1104 and/or within the processing device 1102 during execution thereof by the computer system 1100, the main memory 1104 and the processing device 1102 also constituting machine-readable storage media. The machine-readable storage medium 1124, data storage device 1118, and/or main memory 1104 can correspond to the memory sub-system 110 of FIG. 1.

In one embodiment, the instructions 1126 include instructions to implement functionality corresponding to executing a dereferenced read operation or a dereferenced write operation within a memory sub-system as described herein (e.g., the multi-level dereferencing software 125 of FIG. 1). While the machine-readable storage medium 1124 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory sub-system comprising:
    a set of memory devices; and
    a processing device, operatively coupled to the set of memory devices, configured to perform operations comprising:
        receiving, from a host system, a set of memory sub-system commands to perform a dereferenced read operation, the set of memory sub-system commands comprising a first memory address for a first data structure stored on the set of memory devices and a second memory address for a second data structure stored on the set of memory devices;
        causing the memory sub-system to stall write operations with respect to memory addresses associated with any memory sub-system command that is received after the set of memory sub-system commands;
        after causing the memory sub-system to stall write operations with respect to memory addresses associated with any memory sub-system command that is received after the set of memory sub-system commands, reading, from the set of memory devices, index data located at the second memory address;
        determining a dereferenced memory address based on the first memory address and the index data;
        causing the memory sub-system to stop stalling write operations with respect to at least the second memory address and to continue to stall write operations with respect to at least the dereferenced memory address;
        reading, from the set of memory devices, target data located at the dereferenced memory address; and
        sending a response to the host system that indicates a performance status of the dereferenced read operation.

2. The memory sub-system of claim 1, wherein the set, of memory sub-system commands is received from the host system according to a non-deterministic memory protocol.

3. The memory sub-system of claim 1, wherein the operations further comprise:
    receiving, from the host system, a request to send the target data to the host system; and
    in response to receiving the request to send the target data to the host system, sending the target data to the host system.

4. The memory sub-system of claim 1, wherein the set, of memory sub-system commands comprises information indicating at least one of a data type or a data size associated with at least one of the first memory address or the second memory address.

5. The memory sub-system of claim 1, further comprising:
    a cache operatively coupled to the set of memory devices, the cache comprising a set of command queues;
    wherein the causing the memory sub-system to stall write operations with respect to memory addresses associated with any memory sub-system command that is received after the set of memory sub-system commands comprises:
        stalling, in the set of command queues, any command queue that has a write operation as a next command; and
    wherein the causing the memory sub-system to stop stalling write operations with respect to at least the second memory address and to continue to stall write operations with respect to at least the dereferenced memory address comprises:
        causing a particular command queue, in the set of command queues, associated with at least the second memory address and not associated with the dereferenced memory address to stop stalling.

6. The memory sub-system of claim 1, further comprising:
    a cache operatively coupled to the set of memory devices, the operations further comprising:
        prior to reading the index data located at the second memory address, determining whether the index data located at the second memory address is currently stored in the cache, the reading the index data located at the second memory address comprising:
            in response to determining that the index data located at the second memory address is currently stored in the cache, reading the index data from the cache.

7. The memory sub-system of claim 1, further comprising:
    a cache operatively coupled to the set of memory devices, the operations further comprising:
        prior to reading the index data located at the second memory address, determining whether the index data located at the second memory address is currently stored in the cache, the reading the index data located at the second memory address comprising:
            in response to determining that the index data located at the second memory address is not currently stored in the cache:
                causing the index data located at the second memory address to be copied from the set of memory devices to the cache; and
                reading the index data from the cache.

8. The memory sub-system of claim 7, wherein the cache comprises:
    a plurality of cache lines that comprises a particular cache line associated with the second memory address; and
    a set of command queues, the causing the index data located at the second memory address to be copied from the set of memory devices to the cache comprising:
        determining whether any command queues of the set of command queues is assigned to the particular cache line; and in response to determining that a particular command queue of the set of command queues is assigned to the particular cache line, sending to the particular command queue a read command that causes the index data to be copied from the set of memory devices to the particular cache line.

9. The memory sub-system of claim 7, wherein the cache comprises:
a plurality of cache lines that comprises a particular cache line associated with the second memory address; and
a set of command queues, the causing the index data located at the second memory address to be copied from the set of memory devices to the cache comprising:
determining whether any command queues of the set of command queues is assigned to the particular cache line; and
in response to determining that no command queue of the set of command queues is assigned to the particular cache line:
assigning an available command queue of the set of command queues to the particular cache line; and
sending to the available command queue a read command that causes the index data to be copied from the set of memory devices to the particular cache line.

10. A method comprising:
receiving, from a host system, a set of memory sub-system commands for a memory sub-system to perform a dereferenced write operation, the set of memory sub-system commands comprising a first memory address for a first data structure stored on a set of memory devices of the memory sub-system, a second memory address for a second data structure stored on the set of memory devices, and a third memory address for a write location on the set of memory devices;
causing the memory sub-system to stall write operations with respect to memory addresses associated with the any memory sub-system command that is received after the set of memory sub-system commands;
after causing the memory sub-system to stall write operations with respect to memory addresses associated with any memory sub-system command that is received after the set of memory sub-system commands, reading, from the set of memory devices, index data located at the second memory address;
determining a dereferenced memory address based on the first memory address and the index data;
causing the memory sub-system to stop stalling write operations with respect to at least the second memory address and to continue to stall write operations with respect to at least the dereferenced memory address;
reading, from the set of memory devices, target data located at, the third memory address; and
writing the target data to the set of memory devices at the dereferenced memory address.

11. The method of claim 10, further comprising:
sending a response to the host system that indicates a performance status of the dereferenced write operation;
receiving, from the host, system, a request to send the dereferenced memory address to the host system; and
in response to receiving the request to send the target data to the host system, sending the dereferenced memory address to the host system.

12. The method of claim 10, wherein the set of memory sub-system commands is received from the host system according to a non-deterministic memory protocol.

13. The method of claim 10, wherein the set of memory sub-system commands comprises information indicating at least one of a data type or a data size associated with at least one of the first memory address, the second memory address, or the third memory address.

14. The method of claim 10, wherein the memory sub-system comprises a cache operatively coupled to the set of memory devices, the cache comprising a set of command queues;
wherein the causing the memory sub-system to stall write operations with respect to memory addresses associated with any memory sub-system command that is received after the set of memory sub-system commands comprises:
stalling, in the set of command queues, any command queue that has a write operation as a next command; and
wherein the causing the memory sub-system to stop stalling write operations with respect to at least the second memory address and to continue to stall write operations with respect to at least the dereferenced memory address comprises:
causing a particular command queue, in the set of command queues, associated with at least the second memory address and not associated with the dereferenced memory address to stop stalling.

15. The method of claim 10, further comprising:
prior to reading the index data located at the second memory address, determining whether the index data located at the second memory address is currently stored in a cache of the memory sub-system, the reading the index data located at the second memory address comprising:
in response to determining that, the index data located at the second memory address is currently stored in the cache, reading the index data from the cache.

16. The method of claim 10, further comprising:
prior to reading the index data located at the second memory address, determining whether the index data located at the second memory address is currently stored in a cache of the memory sub-system, the reading the index data located at the second memory address comprising:
in response to determining that the index data located at the second memory address is not currently stored in the cache:
causing the index data located at the second memory address to be copied from the set of memory devices to the cache; and
reading the index data from the cache.

17. The method of claim 16, wherein the cache of the memory sub-system comprises:
a plurality of cache lines that comprises a particular cache line associated with the second memory address; and
a set of command queues, the causing the index data located at the second memory address to be copied from the set of memory devices to the cache comprising:
determining whether any command queues of the set of command queues is assigned to the particular cache line; and
in response to determining that a particular command queue of the set of command queues is assigned to the particular cache line, sending to the particular command queue a read command that causes the index data to be copied from the set it memory devices to the particular cache line.

18. The method of claim 16, wherein the cache of the memory sub-system comprises:
- a plurality of cache lines that comprises a particular cache line associated with the second memory address; and
- a set of command queues, the causing the index data located at the second memory address to be copied from the set of memory devices to the cache comprising:
  - determining whether any command queues of the set of command queues is assigned to the particular cache line; and
  - in response to determining that, no command queue of the set of command queues is assigned to the particular cache line:
    - assigning an available command queue of the set of command queues to the particular cache line; and
    - sending to the available command queue a read command that causes the index data to be copied from the set of memory devices to the particular cache line.

19. A non-transitory computer-readable storage medium comprising instructions that, when executed by a processing device, cause the processing device to perform operations comprising:
- receiving, from a host system, a set of memory sub-system commands to perform a dereferenced read operation, the set of memory sub-system commands comprising a first memory address for a first, data structure stored on a set of memory devices of a memory sub-system and a second memory address for a second data structure stored on the set of memory devices;
- causing the memory sub-system to stall write operations with respect to memory addresses associated with any memory sub-system command that is received after the set of memory sub-system commands;
- after causing the memory sub-system to stall write operations with respect to memory addresses associated with any memory sub-system command that is received after the set of memory sub-system commands, reading, from the set of memory devices, index data located at the second memory address;
- determining a dereferenced memory address based on the first memory address and the index data;
- causing the memory sub-system to stop stalling write operations with respect to at least the second memory address and to continue to stall write operations with respect to at least the dereferenced memory address;
- reading, from the set of memory devices, target data located at the dereferenced memory address; and
- sending a response to the host system that indicates a performance status of the dereferenced read operation.

20. The non-transitory computer-readable storage medium of claim 19, wherein the set of memory sub-system commands is received from the host system according to a non-deterministic memory protocol.

* * * * *